United States Patent [19]

Lee et al.

[11] 4,026,835

[45] May 31, 1977

[54] METHOD OF PREPARING HEAT CURED SILOXANE FOAMS USING RHODIUM CATALYST AND FOAMS PREPARED THEREFROM

[75] Inventors: Chi-Long Lee; Gary M. Ronk, both of Midland, Mich.

[73] Assignee: Dow Corning Corporation, Midland, Mich.

[22] Filed: July 14, 1975

[21] Appl. No.: 595,917

[52] U.S. Cl. .................. 260/2.5 S; 260/37 SB; 260/2.5 D; 260/2.5 FP; 260/46.5 G; 260/46.5 H; 260/46.5 UA; 260/825

[51] Int. Cl.² ................................ C08J 9/02

[58] Field of Search .............. 260/46.5 UA, 46.5 G, 260/46.5 H, 2.5 S, 825

[56] References Cited

UNITED STATES PATENTS

| | | | |
|---|---|---|---|
| 3,070,555 | 12/1962 | Bruner, Jr. | 260/2.5 S |
| 3,425,967 | 2/1969 | Modic | 260/2.5 S |
| 3,677,981 | 7/1972 | Wada et al. | 260/2.5 S |
| 3,923,705 | 12/1975 | Smith | 260/2.5 S |

*Primary Examiner*—Morton Foelak
*Attorney, Agent, or Firm*—Roger H. Borrousch

[57] ABSTRACT

Siloxane foams which are activated and cured by heating can be prepared by mixing an organohydrogensiloxane, a hydroxylated organosiloxane and a rhodium catalyst in amounts such that the ratio of silicon-bonded hydrogen atoms to silicon-bonded hydroxyl radicals is from 2.5 to 40 and thereafter heating the mixture above 90° C. The rhodium catalyst provided a pot life of at least 8 hours when used in amounts of 0.0025 grams per 100 grams of hydroxylated organosiloxane. The siloxane foams can be made to have an increased fire retardant property by adding 0.01 to 2 parts by weight carbon black based on the weight of the total composition. Siloxane foams are also prepared from mixing an organohydrogensiloxane, a hydroxylated organosiloxane, a vinyl containing triorganosiloxy endblocked polydiorganosiloxane and a rhodium catalyst. These foams can be used for cushioning, in acoustical applications and protective filling or coating applications and especially applications wherein fire retarding is important.

25 Claims, No Drawings

METHOD OF PREPARING HEAT CURED SILOXANE FOAMS USING RHODIUM CATALYST AND FOAMS PREPARED THEREFROM

BACKGROUND OF THE INVENTION

1. Field of the Invention

This invention relates to heat activated and cured siloxane foams.

2. Description of the Prior Art

Siloxane foams are known to the art, however, these foams have not had an acceptance in commerce as has other types of foams, such as polyurethane foams. Such a siloxane foam is described by Leonard B. Bruner in U.S. Pat. No. 3,070,555 in which he describes mixing a hydroxylated organopolysiloxane containing silicon-bonded hydrogen, a hydroxylated compound and a stannous salt of a hydrocarbon-soluble carboxylic acid and thereafter allowing the mixture to foam to an elastic product. Another siloxane foam is described by Siegfried Nitzsche et al. in U.S. Pat. No. 3,338,847 in which a foam is prepared from a mixture of a linear hydroxyl endblocked diorganosiloxane polymer, an organohydrogensilicon compound, an aliphatically unsaturated organohydroxy silicon compound and a metal salt of a monocarboxylic acid. Another foam is described by Harold R. Hersh in U.S. Pat. No. 3,429,838 in which a siloxane foam is prepared by mixing a silicone rubber containing a linear, fluid methylpolysiloxane having terminal silicon-bonded hydroxyl groups, diatomaceous earth, zinc oxide, calcined clay, polyethylsilicate and tin octoate with a silicone blowing agent which was a trimethylsilyl chain-stopped dimethylpolysiloxane fluid with some of the silicon-bonded methyl groups replaced by silicon-bonded hydrogen atoms and stannous octoate catalyst.

Also known to the art are fire resistant and self-extinguishing siloxane foams. Ronald L. Joyce in U.S. Pat. No. 2,956,032 describes a fire resistant organosiloxane elastomer foam of the type described by the Bruner patent containing in addition a compound of nickelous bromide, aromatic pentabromoethylbenzene or aromatic pentabromotoluene. Siegfried Nitzsche et al. teach in U.S. Pat. No. 3,428,580 a self-extinguishing organopolysiloxane resin foam containing a resin organosiloxane polymer having alkoxy and hydroxy functionality, a fluid organohydrogen siloxane polymer, a compound having non-acidic reactive hydroxyl groups and a catalyst of quaternary ammonium compounds and carboxylic acid salts of heavy metals.

Although foams can be prepared as described above, there is a problem in use over broad temperature ranges such as from room temperature up to 300° C. and when fire retardant foams are made they often give off toxic vapor ingredients when heated. Thus, a more useful elastomeric siloxane foam is desirable and one which is also non-toxic, particularly when it is fire retardant. It is known that platinum provides fire retardant properties to gum based silicone rubbers as described in U.S. Pat. No. 3,514,424 and from U.S. Pat. No. 3,652,488 that certain silicone rubbers can be made fire retardant by using a combination of platinum and carbon black. From U.S. Pat. No. 3,734,881, it is known that certain room temperature silicone elastomers, namely those containing acetoxy and ketoxime functionality, can be made self-extinguishing and non-toxic by using platinum and carbon black.

From the above prior art, siloxane foams have been prepared and fire retardant siloxane foams have been prepared, however, it was not known heretofor that siloxane foams could be prepared using a rhodium catalyst nor was it known that such foams would be both fire retardant and non-toxic and that increased fire retardancy would be obtained by using carbon black. It was unexpected that a fire retardant foam could be obtained by using a rhodium catalyst in that foams act as very thin section materials compared to the usual solid material and it is known that the same material in thinner section will burn more rapidly than a thicker section, thus foams are generally more combustible than solid materials and it is therefore unexpected that a siloxane foam would be made fire retardant without the conventional fire retardant additives.

SUMMARY OF THE INVENTION

It is an object of this invention to provide a method for making a siloxane foam using rhodium catalysts and a fire retardant siloxane foam which is non-toxic.

This invention relates to a method of making a heat cured organosiloxane foam by mixing an organohydrogensiloxane, a hydroxylated organosiloxane and a rhodium catalyst and thereafter heating the mixture above 90° C. These foams are particularly useful for applications of cushioning and sealing where fire retardancy is of importance.

DESCRIPTION OF THE INVENTION

This invention relates to a method of preparing heat cured organosiloxane foam comprising mixing an organohydrogensiloxane having an average of at least three silicon-bonded hydrogen atoms per molecule, an average of no more than one silicon-bonded hydrogen atom per silicon atom and organic radicals selected from the group consisting of alkyl radicals having from one to six carbon atoms per radical, phenyl and 3,3,3-trifluoropropyl, a hydroxylated organosiloxane having an average of from greater than 1.0 to 2.5 silicon-bonded hydroxyl radicals per molecule and having an average of at least one organic radical per silicon atom selected from the group consisting of alkyl radicals having from one to six carbon atoms per radical, phenyl and 3,3,3-trifluoropropyl and a rhodium catalyst selected from a rhodium complex of a formula selected from the group consisting of $RhCl_3 (S(CH_2CH_3)\{CH_2Si(CH_3)_3\})_3$,
$RhCl_3 (S(CH_2CH_2CH_2CH_3)\{CH_2Si(CH_3)_3\})_3$,
$RhCl_3 \{(CH_3CH_2)_2S\}_3$, $RhCl_3 \{(CH_3CH_2CH_2CH_2)_2S\}_3$,
$Rh_2Cl_6 (P(CH_3)\{CH_2Si(CH_3)_3\}_2)_3$,
$Rh_2Cl_6 (P(CH_3)\{CH_2Si(CH_3)_3\}_2)_4$,
$RhCl_3 (P(C_6H_5)_2\{CH_2Si(CH_3)_3\})_3$,
$RhCl(CO) (P(CH_3)\{CH_2Si(CH_3)_3\}_2)_2$ and
$RhCl(CO)\{P(C_6H_5)_3\}_2$, said rhodium catalyst being present in an amount of at least 0.0025 grams per 100 grams of the hydroxylated organosiloxane, said organohydrogensiloxane and said hydroxylated organosiloxane being present in sufficient amounts to provide a molar ratio of silicon-bonded hydrogen atoms to silicon-bonded hydroxyl radicals of 2.5 to 40, where a mixture is obtained having a viscosity of less than 100,000 cps. at 25° C. and a pot life of at least 8 hours, thereafter heating said mixture above 90° C. to form a foam.

The method of this invention is to mix the ingredients which have a pot life or working time of at least 8 hours and obtain a foam by heating the mixture above 90° C.

These ingredients can be mixed in any manner. Thus, the organohydrogensiloxane can be mixed with the rhodium catalyst and then mixed with the hydroxylated organosiloxane or the rhodium catalyst can be mixed with the hydroxylated organosiloxane and then mixed with the organohydrogensiloxane. Other methods of mixing are also suitable such as the hydroxylated organosiloxane can be divided into two proportions where one proportion is mixed with the rhodium catalyst and the other proportion is mixed with the organohydrogensiloxane and then the two mixtures are combined to form a foam. Additionally, the various optional ingredients can be mixed with one or more of the three required ingredients in any manner as long as a premature reaction does not take place before all three ingredients are present in the mixture. For purposes of storage, the organohydrogensiloxane and the rhodium catalyst should not be stored as a mixture because premature gasing can occur.

The foaming and curing reactions which take place simultaneously can be controlled such that they occur only by heating above 90° C. and a pot life or working time of at least 8 hours is provided by using a rhodium catalyst. This specific rhodium catalyst allows a sufficient working time where the foaming and curing processes occur rapidly when mixtures are heated above 90° C. The foaming and curing is thus obtained on demand allowing one to manipulate the mixture such as depositing it in a mold cavity, spread it into a thin sheet or on an object and then foam and cure on demand by heating above 90° C. The compositions defined herein do not foam when stored at room temperature and require heating to cause the foaming and curing. These compositions will gel at room temperature after long storage whereas the compositions of Smith in U.S. Pat. No. 3,923,705 foam upon setting at room temperature.

This method can also be extended to include adding the mixture of organohydrogensiloxane, hydroxylated organosiloxane and rhodium catalyst to other silicone elastomer compositions, such as those which contain a vinyl organopolysiloxane, an organohydrogensiloxane and a platinum catalyst wherein a useful foam is also obtained. The silicone elastomer composition can be mixed with the organohydrogensiloxane, or the rhodium catalyst, or it can be mixed with both the organohydrogensiloxane and the rhodium catalyst and then the hydroxylated organosiloxane can be added to the mixture. A convenient and preferred method is to add the organohydrogensiloxane last.

The organohydrogensiloxane can be any siloxane having an average of at least three silicon-bonded hydrogen atoms per molecule and an average of no more than one silicon-bonded hydrogen atom per silicon atom. The remaining valences of the silicon atoms are satisfied by divalent oxygen atoms or by monovalent radicals of alkyl having one to six carbon atoms per radical, such as methyl, ethyl, propyl, isopropyl, butyl, tertiary butyl, pentyl, hexyl, cyclohexyl, or phenyl or 3,3,3-trifluoropropyl. The organohydrogensiloxanes can be homopolymers, copolymers and mixtures thereof which contain siloxane units of the following types:

$RSiO_{1.5}$, $R_2SiO$, $R_3SiO_{0.5}$
$RHSiO$, $HSiO_{1.5}$, $R_2HSiO_{0.5}$,
$H_2SiO$, $RH_2SiO_{0.5}$ and $SiO_2$ where R is the monovalent radical defined above. Some specific examples include polymethylhydrogensiloxane cyclics, copolymers of trimethylsiloxy and methylhydrogensiloxane, copolymers of dimethylhydrogensiloxy and methylhydrogensiloxane, copolymers of trimethylsiloxy, dimethylsiloxane and methylhydrogensiloxane and copolymers of dimethylhydrogensiloxane, dimethylsiloxane and methylhydrogensiloxane. Preferably, the organohydrogensiloxanes have an average of at least five silicon-bonded hydrogen atoms per molecule.

The hydroxylated organosiloxanes can be any organosiloxane mixture of organosiloxanes having an average of from greater than 1.0 to 2.5 silicon-bonded hydroxyl radicals per molecule. The organic radicals can be any of those monovalent radicals described above for the organohydrogensiloxane. The hydroxylated organosiloxanes can be homopolymers, copolymers or mixtures thereof. They can be mixtures of different molecular weight species and varying hydroxyl contents as long as the average falls within the defined range. The hydroxylated organosiloxane contains at least one organic radical per silicon atom. Examples of the hydroxylated organosiloxane include hydroxyl endblocked polydimethylsiloxane, hydroxyl endblocked polydiorganosiloxane having silicon units of dimethylsiloxane and phenylmethylsiloxane, hydroxyl endblocked polymethyl-3,3,3-trifluoropropylsiloxane and hydroxyl endblocked polyorganosiloxane having siloxane units of monomethylsiloxane, dimethylsiloxane, monophenylsiloxane and diphenylsiloxane. The hydroxylated organosiloxanes of this invention also includes mixtures of hydroxylated organosiloxane polymers and hydroxylated organosilanes, such as a mixture of hydroxyl endblocked polydimethylsiloxane and diphenylmethylsilanol. As long as some hydroxylated organosiloxane polymer having two or more hydroxyl radicals per molecule is present, hydroxylated silanes can be used to provide from greater than 1.0 to 2.5 silicon-bonded hydroxyl radicals per molecule.

The rhodium complexes, which are catalysts in the present invention, are known in the art. The rhodium complexes containing the diorganosulfur ligands may be prepared according to the disclosure in Journal of the Chemical Society, (A), (1971), 899. The preparation of the silicon containing sulfides are known from and can be prepared by the disclosure in the Journal of Organic Chemistry, 1952, 17 1393. The rhodium complex of the formula

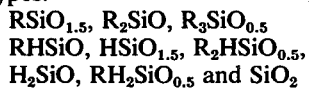

can be prepared by reacting three or four moles of

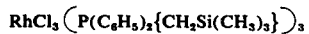

with

in an alcohol solvent at a temperature of from 20° C. to reflux. The phosphorus compounds are known from United Kingdom Patent Specification No. 1,179,242. The rhodium complex of the formula

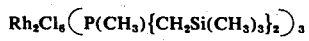

can be prepared by reacting 1.55 to 2 moles of

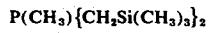

with one mole of $RhCl_3 \cdot 3H_2O$ in an alcohol at reflux. The rhodium complex of the formula $$Rh_2Cl_6(P(CH_3)\{CH_2Si(CH_3)_3\}_2)_4$$

can be prepared by reacting 2.1 to less than 3 moles of $$P(CH_3)\{CH_2Si(CH_3)_3\}_2$$

with one mole of $RhCl_3 \cdot 3H_2O$ in an alcohol at reflux. The rhodium complexes of the formulae $$RhCl(CO)(P(CH_3)\{CH_2Si(CH_3)_3\}_2)_2$$

and $$RhCl(CO)\{P(C_6H_5)_3\}_2$$

can be prepared by treating $RhCl_3 \cdot 3H_2O$ with carbon monoxide in ethanol for several hours and then adding $$P(CH_3)\{CH_2Si(CH_3)_3\}_2$$

or $$P(C_6H_5)_3.$$

The rhodium catalyst can be present in an amount of at least 0.0025 grams per 100 grams of hydroxylated organosiloxane. The upper limit is dependent upon economical considerations. Below the limit of 0.0025 grams of rhodium catalyst, the composition does not foam.

The organohydrogensiloxane and hydroxylated organosiloxane are combined in amounts sufficient enough to provide a ratio of silicon-bonded hydrogen atoms to silicon-bonded hydroxyl radicals of from 2.5 to 40, preferably from 4 to 10. Ratios of less than 2.5 provide foams, but these foams are too friable and weak to be useful in the known applications. The same problem exists at the upper limit. Within the range of the molar ratio of silicon-bonded hydrogen to silicon-bonded hydroxyl, the foam density will decrease as the ratio increases where other factors are constant.

The molecular weight of any particular ingredient is not significant except that it is compatible or dispersible in the total combination and that the total combination has a viscosity of less than 100,000 centipoise (cps.) at 25° C., preferably less than 25,000 cps. at 25° C. Above 100,000 cps., the mixing of the ingredients becomes a problem. The kind of mixing also influences the foam characteristics, such as void size and density. Thorough mechanical mixing is desirable. Because there are so many variables of mixing speeds, equipment types, shearing conditions and the like, it is not practical to define meaningful conditions. Additionally, any set of conditions would vary as to suitability if the nature and amounts of ingredients were changed.

Benzene-soluble vinyl containing triorganosiloxy endblocked polydiorganosiloxanes having an average of about two vinyl radicals per molecule can also be added in amounts up to 85 weight percent based on the combined weight of the vinyl containing triorganosiloxy endblocked polydiorganosiloxane and the hydroxylated organosiloxane. These vinyl containing polydiorganosiloxanes can be mixtures or single specie types and can have organic radicals as defined for the organohydrogensiloxane above plus vinyl. Examples of these types of polymer are widely shown in the prior art such as in U.S. Pat. No. 3,445,420 and U.S. Pat. No. 3,453,234 both which are hereby incorporated by reference to show vinyl containing triorganosiloxy endblocked polydiorganosiloxanes. The vinyl containing triorganosiloxy endblocked polydiorganosiloxanes are preferably present in amounts of 50 weight percent or less, based on the combined weight of the vinyl containing triorganosiloxy endblocked polydiorganosiloxane and the hydroxylated organosiloxane. Although useful foams can be prepared using between 50 and 85 weight percent vinyl containing siloxane, better foams are obtained with mixtures having less than 50 weight percent vinyl containing siloxanes.

The addition of the benzene-soluble vinyl containing triorganosiloxy endblocked polydiorganosiloxanes, whether added as such or added as part of other silicone elastomer compositions can be used to increase the strength of the foam product. When these vinyl siloxanes are present in the mixture, the molar ratio of silicon-bonded hydrogen to silicon-bonded hydroxyl can be varied over a range of from 0.5 to 40. It is not fully understood why this ratio can be varied more broadly with these ingredients, however, the reactions are apparently complex in such mixtures and have not been fully studied to reveal their secrets.

Fillers can also be added to the present mixtures which are used in the method of making foams, such as fume silica, diatomaceous earth, zinc oxide, calcium carbonate, crushed quartz, and the like. The maximum amounts of fillers used will be dependent upon the final viscosity of the composition.

The foams of the present invention have fire retardant properties, as prepared, but for many applications it is desirable to increase this property to give added protection and broaden its areas of use. The fire retardant properties of the foams can be increased without adding ingredients which can give off toxic vapors when burned or in contact with fire. By adding, to the ingredients to be mixed to make a foam, from 0.01 to 2 parts by weight carbon black based on the total weight of the composition, preferably from 0.05 to 1 parts by weight, the fire retardant property of the foam is increased. When the carbon black is used the foams are self-extinguishing in short times and do not give off toxic fumes nor do they contain toxic ingredients.

The foams prepared as described herein are fire retardant and self-extinguishing and are useful for pads, cushions, pillows, ablative pads, fire retardant cushioning of electronic components, fire retardant walls, fire retardant seals, non-burning uses in areas where persons are confined such as buses, trains, airplanes, and the like.

These foams can be varied in density from 0.10 to 0.80 grams per cubic centimeter. These densities can be changed by varying the ratio of silicon-bonded hydrogen to silicon-bonded hydroxyl as well as the filler loadings. The densities of the cured foam products can be controlled by this invention. For a given composition the foam densities decrease by increasing the rhodium catalyst concentration. Also the foam densities can be controlled by changing the foaming temperatures. The foam densities decrease by increasing the foaming temperature. Thus, one can, within limits, control the foam density by changing rhodium catalyst and foaming temperature. The above densities are suggested for conventional types of fillers, however, it may be possible to obtain densities outside this range by using certain non-conventional or exotic fillers.

The following examples are presented for illustrative purposes only and should not be construed as limiting the present invention which is properly delineated in the claims.

EXAMPLE 1

Compositions were prepared by mixing 100 grams of hydroxyl endblocked polydimethylsiloxane having a viscosity of about 12,500 cps. at 25° C., except for Composition B. which had a viscosity of about 2200 cps. at 25° C., 11 grams of hydroxyl endblocked polydimethylsiloxane having about 4 weight percent silicon-bonded hydroxyl radicals, 11 grams of trimethylsiloxy endblocked polymethylhydrogensiloxane having about 1.6 weight percent silicon-bonded hydrogen atoms and an amount of rhodium catalyst solution containing 0.5 weight percent of rhodium complex of the formula

in toluene. The amount of rhodium catalyst used was as shown below. All the compositions had a pot life of at least 8 hours and when heated at 150° C. formed uniform cell foam in 10 minutes having a density of about 18 pounds per cubic foot. Composition D did not foam upon heating at 150° C. and is shown for comparative purposes.

Composition A and B each contained 1.0 gram of rhodium catalyst solution.

Composition C contained 0.53 gram of rhodium catalyst solution.

Composition D contained 0.26 gram of rhodium catalyst solution.

EXAMPLE 2

A composition was prepared by mixing 100 parts by weight of a hydroxyl endblocked polydimethylsiloxane having a viscosity of about 2200 cps. at 25° C., 5 parts by weight of a dimethylvinylsiloxy endblocked polydimethylsiloxane gum having a Williams plasticity between 0.055 and 0.065 inch. 25 parts by weight of diatomaceous earth, 10 parts by weight hydroxyl endblocked polydimethylsiloxane having about 4 weight percent silicon-bonded hydroxyl radicals, 10 parts by weight of trimethylsiloxy endblocked polymethylhydrogensiloxane having about 1.6 weight percent silicon-bonded hydrogen atoms and 0.96 parts by weight of the rhodium catalyst solution defined in Example 1. Heating a sample of the above composition at 150° C., an excellent elastomeric foam formed in about five minutes. The foam had a density of 0.2 grams per cubic centimeter.

EXAMPLE 3

Four compositions were prepared by mixing 100 parts by weight of a hydroxyl endblocked polydimethylsiloxane having a viscosity of about 2200 cps. at 25° C., 10 parts by weight of a dimethylvinylsiloxy endblocked polydiorganosiloxane gum containing about 99.4 mol percent dimethylsiloxane units and 0.6 mol percent methylvinylsiloxane units and having a Williams plasticity in the range of 0.055 to 0.065 inch, 24.4 parts by weight diatomaceous earth, 13.3 parts by weight hydroxyl endblocked polydimethylsiloxane having about 4 weight percent silicon-bonded hydroxyl radical and 11.1 parts by weight trimethylsiloxy endblocked polymethylhydrogensiloxane. Each composition was catalyzed with a toluene solution of the rhodium catalyst defined in Example 1 where the concentration of rhodium catalyst was 3.145 weight percent. The amount of rhodium catalyst solution was as shown in the Table. Composition 4 contained the additional ingredients of 4.48 parts by weight of a methylphenylvinylsiloxy endblocked polydimethylsiloxane having a viscosity of about 400 cps. at 25° C., 0.37 part by weight carbon black and 0.75 part by weight zinc oxide. Composition 4 showed improved flame retardance over the other compositions. Each of the compositions were foamed by heating at 100° C., 150° C. and 200° C. The densities of the foamed products were as shown in the Table given in grams per cubic centimeter (g./cm³).

Table

| Composition | Rhodium Catalyst. parts by weight | Density in g/cm³ Foamed at | | |
|---|---|---|---|---|
| | | 100° C. | 150° C. | 200° C. |
| 1 | 0.11 | 0.333 | 0.194 | 0.175 |
| 2 | 1.11 | 0.256 | 0.152 | 0.155 |
| 3 | 11.11 | 0.138 | 0.119 | 0.109 |
| 4 | 1.11 | 0.269 | 0.181 | 0.176 |

That which is claimed is:

1. A method of preparing a heat cured organosiloxane foam comprising mixing an organohydrogensiloxane having an average of at least three silicon-bonded hydrogen atoms per molecule, an average of no more than one silicon-bonded hydrogen atom per silicon atom and organic radicals selected from the group consisting of alkyl radicals having from one to six carbon atoms per radical, phenyl and 3,3,3-trifluoropropyl, a hydroxylated organosiloxane having an average of from greater than 1.0 to 2.5 silicon-bonded hydroxyl radicals per molecule and having an average of at least one organic radical per silicon atom selected from the group consisting of alkyl radicals having from one to six carbon atoms per radical, phenyl and 3,3,3-trifluoropropyl and a rhodium catalyst selected from a rhodium complex of a formula selected from the group consisting of:

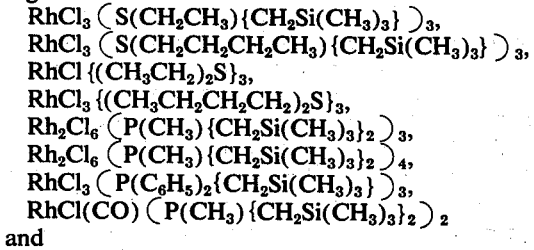

and
RhCl(CO){P(C₆H₅)₃}₂, said rhodium catalyst being present in an amount of at least 0.0025 grams per 100 grams of the hydroxylated organosiloxane, said organohydrogensiloxane and said hydroxylated organosiloxane being present in sufficient amounts to provide a molar ratio of silicon-bonded hydrogen atoms to silicon-bonded hydroxyl radicals of 2.5 to 40, where a mixture is obtained having a viscosity of less than 100,000 cps. at 25° C. and a pot life of at least 8 hours, thereafter heating said mixture above 90° C. to form a foam.

2. The method in accordance with claim 1 in which the organohydrogensiloxane is a trimethylsiloxy endblocked polymethylhydrogensiloxane having a viscosity of less than 100 cps. at 25° C. and the hydroxylated organosiloxane is a hydroxyl endblocked polydimethylsiloxane having a viscosity of less than 25,000 cps. at 25° C.

3. The method in accordance with claim 2 in which the hydroxylated organosiloxane is a mixture of a hydroxyl endblocked polydimethylsiloxane having a viscosity of from 1000 to 25,000 cps. at 25° C. and a hydroxyl endblocked polydimethylsiloxane having a viscosity of from 20 to 200 cps. at 25° C.

4. The method in accordance with claim 1 in which carbon black is present in an amount of from 0.01 to 2 parts by weight based on the weight of the total composition.

5. The method in accordance with claim 2 in which carbon black is present in an amount of from 0.01 to 2 parts by weight based on the weight of the total composition.

6. The method in accordance with claim 3 in which carbon black is present in an amount of from 0.01 to 2 parts by weight based on the weight of the total composition.

7. A method of preparing a heat cured organosiloxane foam comprising mixing an organohydrogensiloxane having an average of at least three silicon-bonded hydrogen atoms per molecule, an average of no more than one silicon-bonded hydrogen atom per silicon atom and organic radicals selected from the group consisting of alkyl radicals having from one to six carbon atoms per radical, phenyl and 3,3,3-trifluoropropyl, a hydroxylated organosiloxane having an average of from 1.5 to 2.5 silicon-bonded hydroxyl radicals per molecule and having an average of at least one organic radical per silicon atom selected from the group consisting of alkyl radicals having from one to six carbon atoms per radical, phenyl and 3,3,3-trifluoropropyl, a benzene-soluble vinyl containing triorganosiloxy endblocked polydiorganosiloxane having an average of about two vinyl radicals per molecule and present in an amount equal to no more than 85 weight percent of the combined weight of the hydroxylated organosiloxane and the benzene-soluble vinyl containing triorganosiloxy endblocked polydiorganosiloxane, the organic radicals of the benzene-soluble vinyl containing triorganosiloxy endblocked polydiorganosiloxane being selected from the group consisting of alkyl radicals having from one to six carbon atoms per radical, phenyl, vinyl and 3,3,3-trifluoropropyl and a rhodium catalyst selected from a rhodium complex of a formula selected from the group consisting of

RhCl$_3$ {(CH$_3$CH$_2$)$_2$S}$_3$,
RhCl$_3$ {(CH$_3$CH$_2$CH$_2$CH$_2$)$_2$S}$_3$,
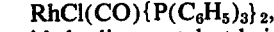
Rh$_2$Cl$_6$ (P(CH$_3$){CH$_2$Si(CH$_3$)$_3$}$_2$)$_4$,
RhCl$_3$(P(C$_6$H$_5$)$_2${CH$_2$Si(CH$_3$)$_3$})$_3$,
RhCl(CO)(P(CH$_3$){CH$_2$Si(CH$_3$)$_3$}$_2$)$_2$
and
RhCl(CO){P(C$_6$H$_5$)$_3$}$_2$, said rhodium catalyst being present in an amount of at least 0.0025 grams per 100 grams of the hydroxylated organosiloxane, said organohydrogensiloxane and said hydroxylated organosiloxane being present in sufficient amounts to provide a molar ratio of silicon-bonded hydrogen atoms to silicon-bonded hydroxyl radicals of 0.5 to 40, where a mixture is obtained having a viscosity of less than 100,000 cps. at 25° C. and a pot life of at least 8 hours, thereafter heating said mixture above 90° C. to form a foam.

8. The method in accordance with claim 7 in which carbon black is present in an amount of from 0.01 to 2 parts by weight based on the weight of the total composition.

9. The method in accordance with claim 8 in which the organohydrogensiloxane is a trimethylsiloxy endblocked polymethylhydrogensiloxane having a viscosity of less than 100 cps. at 25° C. and the hydroxylated organosiloxane is a mixture of a hydroxyl endblocked polydimethylsiloxane having a viscosity of from 100 to 25,000 cps. at 25° C. and a hydroxyl endblocked polydimethylsiloxane having a viscosity of from 20 to 200 cps. at 25° C.

10. The method in accordance with claim 9 in which the benzene-soluble vinyl containing triorganosiloxy endblocked polydiorganosiloxane is a phenylmethylvinylsiloxy endblocked polydimethylsiloxane having a viscosity of less than 25,000 cps. at 25° C.

11. The method in accordance with claim 1 in which fillers are present.

12. The method in accordance with claim 3 in which fillers are present.

13. The method in accordance with claim 4 in which fillers are present.

14. The method in accordance with claim 7 in which fillers are present.

15. The method in accordance with claim 9 in which fillers are present.

16. The method in accordance with claim 10 in which fillers are present.

17. A foam prepared by the method of claim 7.
18. A foam prepared by the method of claim 9.
19. A foam prepared by the method of claim 10.
20. A foam prepared by the method of claim 11.
21. A foam prepared by the method of claim 12.
22. A foam prepared by the method of claim 13.
23. A foam prepared by the method of claim 14.
24. A foam prepared by the method of claim 15.
25. A foam prepared by the method of claim 16.

* * * * *

UNITED STATES PATENT AND TRADEMARK OFFICE
CERTIFICATE OF CORRECTION

PATENT NO. : 4,026,835

DATED : May 31, 1977

INVENTOR(S) : Chi-Long Lee and Gary M. Ronk

It is certified that error appears in the above-identified patent and that said Letters Patent are hereby corrected as shown below.

In Column 4, line 22, the word "silicon" should read "siloxane".

Signed and Sealed this

Thirteenth Day of October 19

[SEAL]

Attest:

GERALD J. MOSSINGHOFF

Attesting Officer

Commissioner of Patents and Trademarks